H. KILE.
CONVEYER.
APPLICATION FILED MAY 6, 1907.
917,769.
Patented Apr. 13, 1909.
3 SHEETS—SHEET 2.
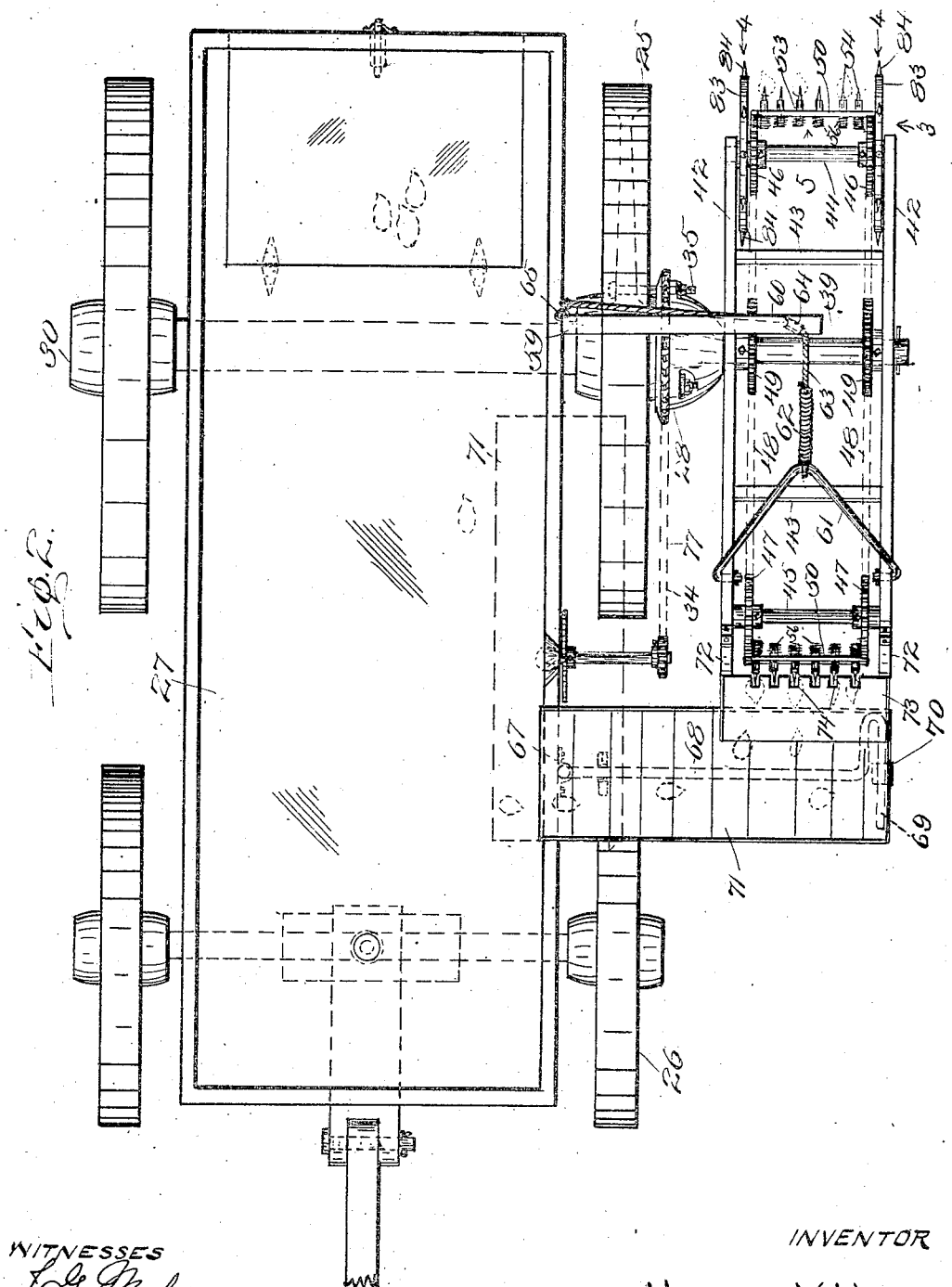
WITNESSES
INVENTOR
Henry Kile
Mason Fenwick Lawrence
ATTORNEYS.

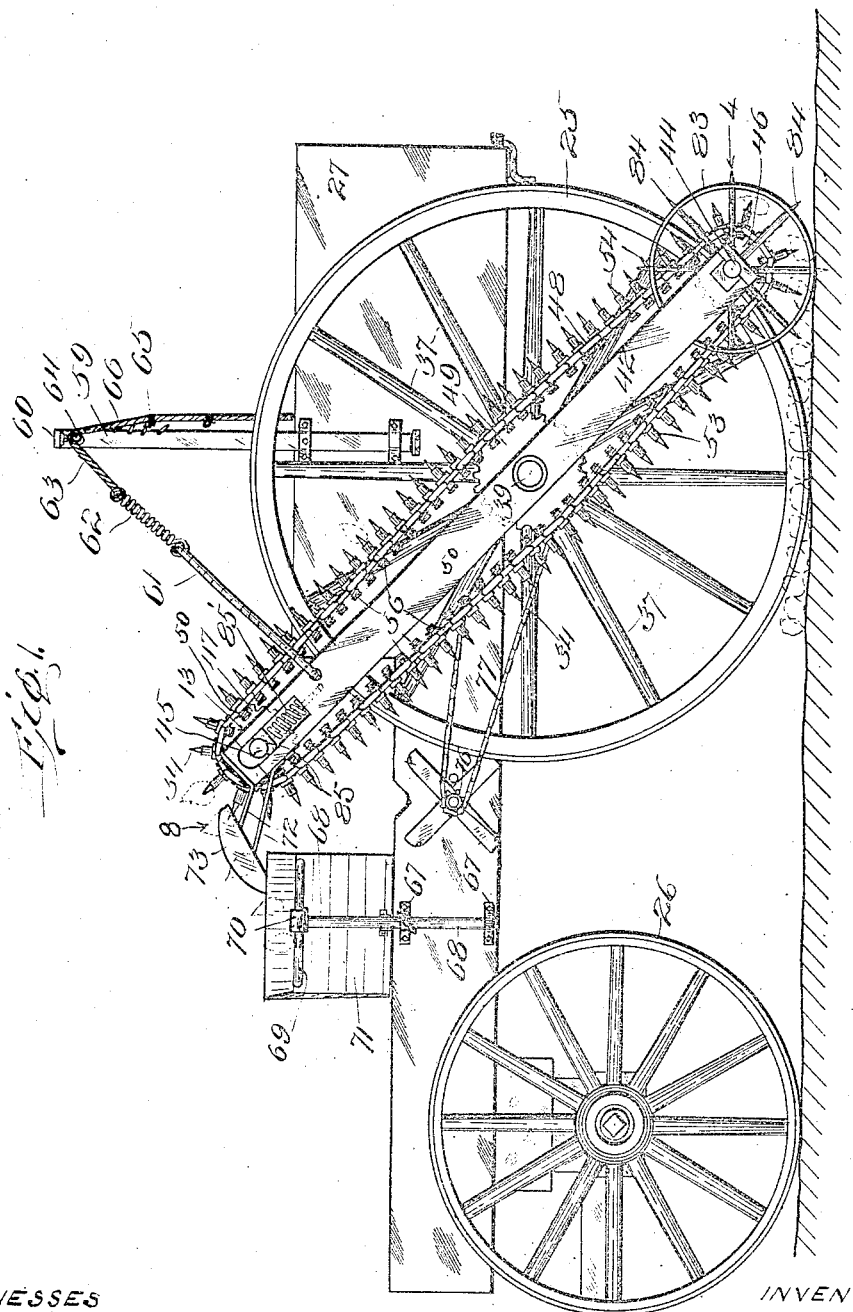

H. KILE.
CONVEYER.
APPLICATION FILED MAY 6, 1907.
917,769.
Patented Apr. 13, 1909.
3 SHEETS—SHEET 3.
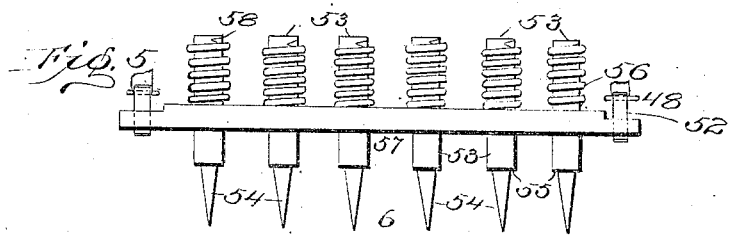
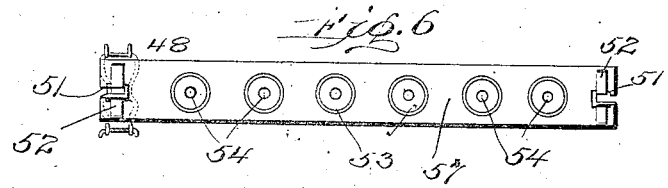
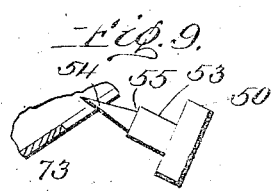
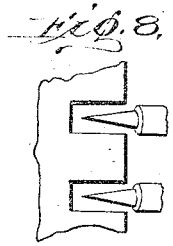
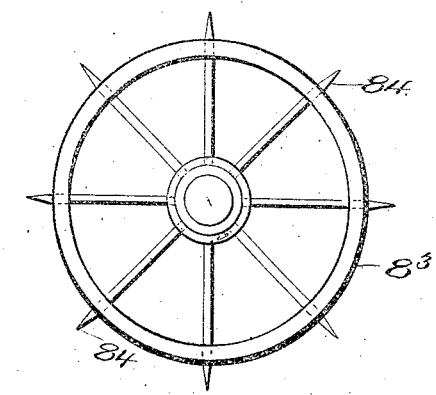
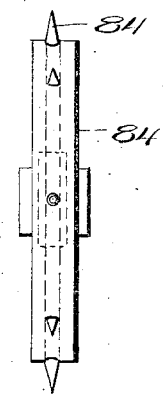
Witnesses
J. M. Fowler Jr.
H. Strauss
Inventor
Henry Kile
By Mason Fenwick & Lawrence
Attorneys

UNITED STATES PATENT OFFICE.

HENRY KILE, OF GREELEY, COLORADO.

CONVEYER.

No. 917,769.      Specification of Letters Patent.      Patented April 13, 1909.

Application filed May 6, 1907. Serial No. 372,221.

*To all whom it may concern:*

Be it known that I, HENRY KILE, a citizen of the United States, residing at Greeley, in the county of Weld and State of Colorado, have invented certain new and useful Improvements in Conveyers; and I do hereby declare the following to be a full, clear, and exact description of the invention, such as will enable others skilled in the art to which it appertains to make and use the same.

This invention relates to conveyers for beet harvesters, and has for an object to provide a device of the class embodying new and improved features of reliability, economy and strength.

A further object of the invention is to provide in a beet harvester mechanism adapted to be attached to a running gear of an ordinary farm wagon and to receive motion therefrom and deposit beets therein.

A further object of the invention is to provide in a beet harvester a conveyer provided with impaling points of improved form.

With these and other objects in view, the invention comprises certain novel constructions, combinations and arrangements of parts, as will be hereinafter fully described and claimed.

In the drawings:—Figure 1 is a view in side elevation of the improved beet harvester attached to a running gear of an ordinary farm wagon. Fig. 2 is a top plan view of a farm wagon and the improved beet harvester attached thereto. Fig. 3 is a view in side elevation of the earth engaging wheel for operating the conveyer. Fig. 4 is a view in edge elevation of the earth engaging wheel shown at Fig. 3. Fig. 5 is a detail side elevation of one of the bars of the conveyer with the impaling points carried thereby. Fig. 6 is a view in bottom plan of the bar of the conveyer shown in Fig. 5. Fig. 7 is a view in end elevation of the conveyer slat and attaching means shown at Figs. 5 and 6. Fig. 8 is a view in top plan of a fragment of the stripper and two of the impaling points shown in association therewith. Fig. 9 is a view in vertical section of a fragment of the stripper and one of the impaling points.

Like characters designate similar parts throughout the several views and the several sections and positions of various figures are indicated by arrows and section lines numbered similar to the numerals of the figures.

The improved conveyer forming the subject-matter of this application is adapted for use as part of a beet harvester to be secured to a farm wagon of the usual and ordinary structure here shown conventionally as composed of the rear wheels 25 and front wheels 26, the other parts of the wagon not being shown. The usual and ordinary body or box of a wagon may be employed but a special body is here shown at 27 as the various parts may be attached thereto and need not be removed therefrom each time the device is put out of operation. To the hub of one of the rear wheels a cap or attaching member 28 is applied which cap adapts the device to serve as a sprocket for engaging and moving the sprocket chain 34. For securing the attaching member 28 to the hub tension screws 35 are employed and inserted between two of the spokes 37 of the wheel to bear against the inner surfaces of the said spokes and retain the member 28 rigidly in position. The member 28 is provided with a shaft 39 upon which shaft is mounted a frame comprising the side rails 42 and cross pieces 43, and between and at opposite ends of the said rails 42 are journaled shafts 44 and 45, the former intended to serve as the lower shaft of the elevator. Upon the shafts 44 and 45 are respectively mounted sprocket wheels 46 and 47 carrying sprocket chains 48 which said sprocket chains pass over idlers or carrying sprockets 49 preferably loosely mounted upon the shaft 39 in case the shaft is keyed, or to be rigidly secured thereto and rotate therewith in case the shaft 39 is free to rotate in the member 28. If it is desired to operate the conveyer from the wagon wheel the sprockets 46 and 47 are keyed to the shafts 44 and 45 and the shaft 39 keyed to the hub engaging means.

Extending between the sprocket chains 48 are a plurality of spaced slats or strips 50 secured to the chain in any approved manner but preferably by means of key-hole slots 51 formed in the opposite ends of the said slats and with resilient keys or keepers 52 embracing a link of the chain and retained within the slot by means of the construction of the opening as shown particularly in Figs. 5, 6 and 7. The several cleats or bars 50 carry the impaling points which may be of any approved material, length and conformation, but preferably comprise bolts 53 provided with points 54 and with shoulders 55 positioned to permit the impalement of an object thereon to only a limited extent. The bolts 53 and their points 54 are preferably yieldingly mounted in the strip 50 as by means of springs 56 inserted through the strip 50 and bent over as at 57 with the upper or outer end bent to engage the end of the bolt as at 58.

The conveyer composed of the frame and sprocket chains and strips is intended to operate at an inclination, especially as shown in Fig. 1, and is supported by means of an upright 59 attached to the side of the body and having an outstanding arm or jib 60. A bail 61 is attached to the side rails 42 and a spring 62 connected with the bail. From the spring 62 a cable 63 runs over a pulley 64 and is provided with a hook 65 adapted to engage one of a series of rings 66 carried by the upright 59. It will be seen that by attaching the hook 65 to the several rings 66 the conveyer may be adjusted to assume a desired inclination or a horizontal position.

Upon the side of the body adjacent the conveyer a pair of straps 67 are secured and a support 68 pivotally mounted therein extending at an inclination upward and ending in a transversely disposed cross-head 69 engaging within the spring clip 70 so that the chute 71 carried thereon may be removed therefrom by disengaging the spring clip 70 from the cross-head 69. As the support 68 is pivotally secured within the straps 67 it is obvious that the chute may be swung pivotally about upon the support.

Upon the upper ends of the side bars 42 are secured bracing straps 72 by which a stripper 73 is carried by the conveyer in position to extend over the chute 71, the said stripper being provided with notches 74 proportioned to permit the impaling points 54 to pass therethrough and to remove therefrom any article impaled thereon.

To sustain the conveyer, wheels 83 are mounted upon the shaft 44 and provided with points 84 extending radially from the periphery thereof and the shaft 45 is journaled in a sliding box 85 with a spring 85' positioned to hold the shaft 45 with the sprocket chains 48 always at tension. By means of the spiked wheel 83 the conveyer belt moves so that the conveyer never drags and the teeth will not tear the beets.

In operation the machine is transported to the field with the conveyer swung to a horizontal position and after arriving at the place to be operated upon the conveyer is tilted to assume the position shown in Fig. 1, so that the points 84 engage the ground and with the periphery of the wheels 83 bearing thereupon. The engagement of the points 84 causes the wheels 83 and the shaft 44 to rotate, thereby moving the sprocket chains and the impaling points 54 carried thereby to impale objects as beets or other vegetables and to carry them, as shown particularly in Fig. 1 upwardly upon the upper side of the conveyer and to engage the stripper 73 to remove the objects from the impaling points, the object then falling from the stripper upon the chute 71 and being deposited in the body 27.

It will be understood that the yielding impaling points may be used upon a conveyer of other construction than that shown and that the points may be made to yield by other means than the single means employed.

What I claim is:—

1. In a beet harvester, a conveyer provided with a transverse strip, bolts inserted through the strip, impaling points carried by the bolts, and means adapted to hold the bolts yieldingly in operative position.

2. In a beet harvester, a conveyer, a strip extending transversely of the conveyer, bolts inserted through the strip, impaling points carried by the bolts and separated therefrom by a shoulder, springs connecting the bolts with the strip, means to operate the conveyer, and means to remove material from the impaling points.

3. In a beet harvester, a conveyer provided with a transverse bar, a bolt extending through the bar and longitudinally movable therein, and a spring adapted to hold the bolt yieldingly in operative position.

4. In a beet harvester, a conveyer provided with vertically yielding impaling points.

5. In a beet harvester, a conveyer provided with vertically yielding impaling points, and means to actuate the conveyer.

6. In a beet harvester, a conveyer provided with vertically yielding impaling points, and means to sustain the end of the conveyer in desired proximity to the ground.

7. In a beet harvester, a conveyer provided with vertically yielding impaling points, and a spiked wheel to sustain the end of the conveyer in the desired proximity to the ground.

8. In a beet harvester, a conveyer embodying transverse members, and impaling points yieldingly seated in the transverse members.

9. In a beet harvester, a conveyer provided with a transverse member, bolts slidably seated in the transverse member, impaling points carried by the bolts, and means for holding the impaling points yieldingly in operative position.

10. In a beet harvester, a conveyer embodying transverse strips, bolts slidably inserted through the strips, impaling points carried by the bolts upon one side of the strips, and resilient members disposed upon the opposite side of the strips and arranged to hold the impaling points yieldingly in operative position.

11. In a beet harvester, an endless chain conveyer carrying vertically yielding impaling points.

12. In a beet harvester, an endless chain conveyer adapted to rotate in proximity to the ground provided with impaling points yielding vertically.

13. In a beet harvester, an endless chain conveyer provided with transversely extending strips, impaling points carried thereby and yieldingly at right angles of the strips.

14. In a beet harvester, a conveyer provided with vertically yielding impaling points, and means to remove material from the impaling points.

15. In a beet harvester, a conveyer frame, an endless conveyer chain comprising a plurality of links, transverse strips united to such chain, two inner members integrally positioned on said strip, impaling points resiliently mounted in said members, and means for actuating said conveyer, and means to hold said conveyer in desired proximity to the ground.

16. In a device of the class described, a conveyer adapted to be carried by a vehicle, vertically yielding impaling points carried by the conveyer, and means to hold the conveyer with the impaling points in contact with the ground.

In testimony whereof I have affixed my signature in presence of two witnesses.

HENRY KILE.

Witnesses:
ISABEL M. STRONG,
CARLE WHITEHEAD.